2,889,227

PROCESS OF RETAINING SOFTNESS IN BAKERY PRODUCTS

Chester W. Ofelt, Valhalla, N.Y., and John E. Hodge, Peoria, Ill., assignors to the United States of America as represented by the Secretary of Agriculture No Drawing. Application August 19, 1958
Serial No. 756,048

3 Claims. (Cl. 99—91)

(Granted under Title 35, U.S. Code (1952), sec. 266)

A non-exclusive, irrevocable, royalty-free license in the invention herein described, throughout the world for all purposes of the United States Government, with the power to grant sublicenses for such purposes, is hereby granted to the Government of the United States of America.

This application is a continuation-in-part of application bearing Serial No. 623,509, filed November 20, 1956.

This invention relates in general to the production of bakery products such as bread, sweet rolls, cakes, and the like which are characterized by an ability to retain much of their original softness of crumb for a considerable period of time. Specifically, the invention relates to processes wherein certain agents, namely, ascorbyl palmitate and hydrogenated ascorbyl palmitate, are incorporated into the dough prior to baking whereby staling of the baked product will be effectively retarded.

Ascorbyl palmitate with free enolic hydroxyl groups may be conveniently prepared by the method of Wells and Swern described in their Patent No. 2,350,435.

The hydrogenated ascorbyl palmitate is prepared by hydrogenating the ascorbyl palmitate (prepared as described above) whereby the double bond in the ascorbyl chain is saturated. This hydrogenation technique is carried out as follows:

Fifty grams of ascorbyl palmitate was disolved in 150 ml. absolute alcohol and placed in a stainless steel hydrogenation vessel. To this container was added 10 grams of Raney nickel catalyst and the whole hydrogenated under 1600 lbs./sq. in. pressure at 160° C. for 39 hours. The final solution was filtered from the catalyst, decolorized with activated carbon, and vacuum evaporated to dryness. Twenty-four grams of the crude product was recrystallized from 50% aqueous methanol. Yield 20 grams. The product showed no reducing power toward acidified iodine solution or Tillmans reagent.

The reaction which occurs is represented by the following equation:

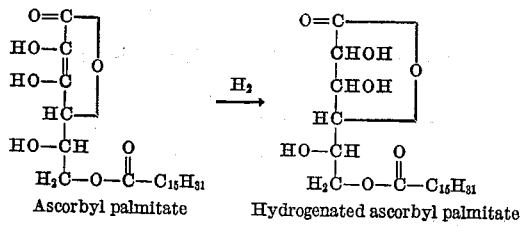

In the above formula for the ascorbyl palmitate, the cis arrangement of enolic hydroxyl group—which is correct for the solid substance—is depicted. In the formula for the hydrogenated ascorbyl palmitate, however, the conventional "CHOH" configuration on the second and third carbon atoms is shown and includes both the $$H\overset{|}{C}-OH \text{ and } HO-\overset{|}{C}H$$

arrangements.

In applying the process of the invention, the ascorbyl palmitate or the hydrogenated ascorbyl palmitate is incorporated into the dough, prior or subsequent to its raising by fermentation, in a percentage from 0.1 to 1.0 and preferably from 0.1 to 0.4, based on the weight of flour. Usually it is most convenient to incorporate the ascorbyl palmitate or hydrogenated ascorbyl palmitate into the shortening before this is incorporated with the flour and other ingredients. In any event, the dough apart from containing the added palmitate is prepared and processed in the customary manner as is well understood in the baking trade. The palmitate may be added to yeast-raised doughs of any type whether for preparation of white bread, coffee cake, sweet rolls, buns, doughnuts, and specialty breads such as raisin, whole wheat, low-protein, rye, corn, potato, sour-dough, etc.

By addition of the said ascorbyl palmitate or hydrogenated ascorbyl palmitate to the dough, the resulting bakery products will retain their freshness for 2 to 4 days longer than bakery products prepared without addition of any anti-staling agent. In this respect it may be noted that the palmitates of the invention exhibit an anti-staling effect equal to that of the best monoglyceride bread-softeners presently available for this purpose. The palmitates of the invention are effectively used in baked products which are of the high-fat or low-fat categories. For instance the palmitates may be successfully employed in bread formulas containing anywhere from 1 to 10% or more of shortening.

The invention is further demonstrated by the following example, in which, in order to demonstrate the effectiveness of the palmitates of the invention a series of breads were prepared. One lot contained no anti-staling agent (control), another lot contained 0.4% (based on weight of flour) of glycerol monostearate (a conventional bread softener), a third lot contained 0.4% (based on weight of flour) of ascorbyl palmitate prepared as described above, and a fourth lot contained 0.4% (based on weight of flour) of hydrogenated ascorbyl palmitate, also prepared as described above.

The following formula was used:

| | |
|---|---:|
| Flour _____grams__ | 660 |
| Water _____ml__ | 430 |
| Salt _____grams__ | 13.2 |
| Sugar _____do____ | 39.6 |
| Active dry yeast _____do____ | 2.97 |
| Potassium bromate _____do____ | 0.0099 |
| Calcium chloride _____do____ | 0.363 |
| Ammonium sulphate _____do____ | 0.429 |

Additional ingredients for different lots as follows:

Lot 1: Lard_____ 26.4 grams (4% based on flour).

Lot 2:
    Lard_____ 23.76 grams (3.6% based on flour).
    Glycerol monostearate___ 2.64 grams (0.4% based on flour).

Lot 3:
    Lard_____ 23.76 grams (3.6% based on flour).
    Ascorbyl palmitate_____ 2.64 grams (0.4% based on flour).

Lot 4:
    Lard_____ 23.76 grams (3.6% based on flour).
    Hydrogenated ascorbyl palmitate_____ 2.64 grams (0.4% based on flour).

A. *Preparation of ingredients.*—A solution was prepared containing 475.2 grams of sugar, 158.5 grams salt in 2112 ml. water whereby 228.8-gram aliquots of solution provided the proper amount of salt and sugar for each mix of 660 grams of flour.

Dried yeast (81 grams) was dispersed in water (519 ml.) so that a 50-gram aliquot provided the proper amount of yeast for a 660-gram flour mix. The yeast was dispersed in water at 115° F. and maintained at this temperature for at least 5 minutes before use.

The potassium bromate was dissolved in water (6.6 grams per liter) so that a 1.5 ml. aliquot yielded a concentration of 0.0015% in a mix with 660 grams of flour.

The calcium chloride was dissolved in water (72.6 grams/liter) so that a 5-ml. aliquot yielded a concentration of 0.055% in a 660-gram flour mix.

The ammonium sulphate was dissolved in water (85.8 grams/liter) so that a 5-ml. aliquot yielded a concentration of 0.065% in a 660-gram flour mix.

B. *Mixing procedure.*—The flour (a 2:1 blend of hard red winter and hard red spring), shortening, anti-staling ingredient (if any), yeast suspension, sugar-salt solution, $CaCl_2$ solution, $(NH_4)_2SO_4$ solution, $KBrO_3$ solution, and the remainder of water required were placed in a Hobart mixer with McDuffee bowl and after incorporation for 30 seconds at low speed were mixed to optimum development (280 seconds) at second speed according to usual straight dough procedure.

C. *Fermentation and baking.*—The dough was fermented at 86° F. and 85% r.h. for 105 minutes, "punched" by hand, fermented for another 30 minutes then scaled to 535-gram pieces, de-gassed by passing through a National 1 lb. dough sheeter, fermented for 15 minutes more and then molded by passing through a pair of sheeting rolls 3 times at ⅝", ⅜" and ⅛" then curling by hand and placing in a standard 1 lb. loaf tin. The doughs were proofed to ⅝" over the top of the pan at 95–98° F. and 85% r.h. They were then baked in a rotating hearth oven at 425° F. with only bottom heat and with low pressure steam admitted to the oven. They were weighed and measured for loaf volume immediately upon removal from the oven. The loaves were cooled for one hour at room atmosphere. They were then wrapped in double waxed glassine paper with heat sealing ends and bottom. They were stored at approximately 78° F. 45% r.h. for 45 hours prior to softness evaluation.

D. *Softness evaluation.*—After 45 hours' storage each loaf was tested for crumb firmness with a modified Bloom gelometer. The weight necessary to cause a depression of 4 mm. using a 1" diameter disc at the slice center was determined on 12 center slices from each loaf. Loaves were in duplicate from each mix and mixes were in quadruplicate to yield a total of eight loaves for each treatment. Results were averaged and, after statistical analysis, corrected to a constant loaf volume of 2770 ml. The results are tabulated below:

| Lot | Shortening | Antistaling ingredient | Firmness of Crumb, grams | Deviation from Control, grams |
|---|---|---|---|---|
| 1 | Lard, 4% | None | 104.7 | |
| 2 | Lard, 3.6% | Glycerol monostearate, 0.4%. | 93.3 | −11.4 |
| 3 | Lard, 3.6% | Ascorbyl palmitate, 0.4% | 91.7 | −13 |
| 4 | Lard, 3.6% | Hydrogenated ascorbyl palmitate, 0.4%. | 94.2 | −10.5 |

As may be seen from the above table, ascorbyl palmitate is an excellent anti-staling agent. However, the bread into which it had been incorporated had somewhat browner crumb than the control bread, indicating that its use might be limited to brown breads and bakery products wherein a white crumb is not required.

We claim:

1. A process for inhibiting the staling of yeast-raised bakery products comprising incorporating into the dough, prior to baking, about 0.1 to 1%, based on the weight of the flour, of a member selected from the group consisting of ascorbyl palmitate having the formula

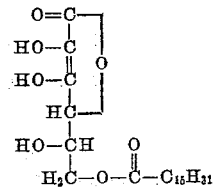

and hydrogenated ascorbyl palmitate having the formula

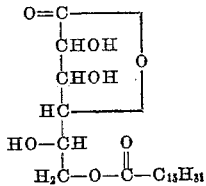

2. A process for inhibiting the staling of yeast-raised bakery products comprising incorporating into the dough, prior to baking, about 0.1 to 1%, based on the weight of the flour, of ascorbyl palmitate having the formula

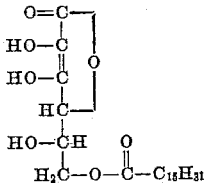

3. A process for inhibiting the staling of yeast-raised bakery products comprising incorporating into the dough, prior to baking, about 0.1 to 1%, based on the weight of the flour, of hydrogenated ascorbyl palmitate having the formula

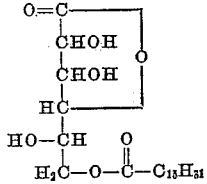

References Cited in the file of this patent

FOREIGN PATENTS 648,782    Great Britain _____ Jan. 10, 1951
652,006    Great Britain _____ Apr. 11, 1951

OTHER REFERENCES

Cereal Chemistry, vol XXVI, No. 5 (September 1949).
Bakers Digest, vol. 31, No. 3 (June 1957), 1065.